US012692934B2

(12) United States Patent　　　(10) Patent No.:　US 12,692,934 B2
Henn et al.　　　　　　　　　　　(45) Date of Patent:　　　Jul. 28, 2026

(54) TRANSMISSION COMPRISING AN OIL-GUIDING CHANNEL COMPONENT

(71) Applicant: Robert Bosch GmbH, Stuttgart (DE)

(72) Inventors: Andreas Henn, Aalen (DE); Benjamin Lukas Mehnert, Schwieberdingen (DE); Manfred Saretzki, Stuttgart (DE); Martin Armbruster, Brackenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/714,239

(22) PCT Filed: Nov. 7, 2022

(86) PCT No.: PCT/EP2022/080919
§ 371 (c)(1),
(2) Date: May 29, 2024

(87) PCT Pub. No.: WO2023/099119
PCT Pub. Date: Jun. 8, 2023

(65) Prior Publication Data
US 2025/0020201 A1　　Jan. 16, 2025

(30) Foreign Application Priority Data

Nov. 30, 2021　(DE) ..................... 10 2021 213 485.8

(51) Int. Cl.
*F16H 57/04*　　　(2010.01)
(52) U.S. Cl.
CPC ..... *F16H 57/0423* (2013.01); *F16H 57/0409* (2013.01); *F16H 57/045* (2013.01); *F16H 57/0457* (2013.01); *F16H 57/0476* (2013.01)
(58) Field of Classification Search
CPC ............. F16H 57/0409; F16H 57/0423; F16H 57/045; F16H 57/0457; F16H 57/0476
See application file for complete search history.

(56) References Cited

U.S. PATENT DOCUMENTS 1,220,811 A * 3/1917 Alquist ............... F16H 57/0447
　　　　　　　　　　　　　　　　　　384/129
3,529,698 A * 9/1970 Nelson ................ F16H 57/0447
　　　　　　　　　　　　　　　　　　184/6.12
(Continued)

FOREIGN PATENT DOCUMENTS

CN　　　113932003 A　　1/2022
CN　　　117704040 A　　3/2024
(Continued)

OTHER PUBLICATIONS

Non-final Office Action issued by the U.S. Patent Office for U.S. Appl. No. 18/714,271, dated Mar. 7, 2025 (15 pages).
(Continued)

*Primary Examiner* — Minh Truong
(74) *Attorney, Agent, or Firm* — Michael Best & Friedrich LLP

(57) ABSTRACT

A transmission (100) including a transmission gear (107) arranged in a transmission housing (140) and in an oil sump (150). The transmission (100) includes an oil-guiding channel component (1) having a guide channel (2) and an oil collection region (13*a*) having a drain (15*a*). During operation, oil enters an inlet port (11) of the guide channel (2) and passes along the oil guidance direction (F) of the guide channel (2) to an outlet port (12) of the guide channel (2). The oil collection region (13*a*) includes a first reservoir (13) having a first reservoir wall (25) and a reservoir base (24). The inlet port (11) is located at the end face of the transmission gear (107), the reservoir base (24) is located above the transmission gear (107), and the oil guidance direction (F) from the inlet port (11) to the outlet port (12) extends opposite the direction of gravity (G).

13 Claims, 7 Drawing Sheets

(56) References Cited

U.S. PATENT DOCUMENTS

| | | | |
|---|---|---|---|
| 8,931,596 B2 | 1/2015 | Shioiri et al. | |
| 9,074,679 B2 | 7/2015 | Araki | |
| 9,103,432 B2 | 8/2015 | Isomura et al. | |
| 9,528,593 B2 * | 12/2016 | Tage | F16H 3/089 |
| 9,581,236 B2 | 2/2017 | Tage et al. | |
| 10,746,282 B2 * | 8/2020 | Ito | F16H 57/0471 |
| 10,859,152 B2 | 12/2020 | Yu et al. | |
| 11,486,486 B2 * | 11/2022 | Trinh | F16H 57/0423 |
| 12,055,210 B2 | 8/2024 | Hirata et al. | |
| 2004/0154846 A1 * | 8/2004 | Kira | B60K 6/26 |
| | | | 903/952 |
| 2011/0214947 A1 | 9/2011 | Tuomas | |
| 2011/0319215 A1 * | 12/2011 | Katoh | F16H 57/0434 |
| | | | 475/159 |
| 2013/0283955 A1 * | 10/2013 | Araki | F16H 57/043 |
| | | | 74/467 |
| 2019/0186622 A1 * | 6/2019 | Ishikawa | H02K 7/083 |
| 2024/0110622 A1 | 4/2024 | Krause et al. | |
| 2024/0318717 A1 | 9/2024 | Cheron et al. | |
| 2025/0020202 A1 | 1/2025 | Hegedus et al. | |
| 2025/0020204 A1 | 1/2025 | Henn et al. | |

FOREIGN PATENT DOCUMENTS

| | | |
|---|---|---|
| DE | 1291966 B | 4/1969 |
| DE | 102007021686 A1 | 11/2008 |
| DE | 102017108748 B3 | 8/2018 |
| DE | 102019006118 A1 | 3/2020 |
| DE | 102020204587 A1 | 11/2020 |
| DE | 102012215355 B4 | 9/2021 |
| DE | 102021211977 A1 | 4/2023 |
| DE | 202023002785 U1 | 7/2024 |
| DE | 102024107189 A1 | 9/2024 |
| EP | 2700849 A1 | 2/2014 |
| EP | 3018386 A1 | 5/2016 |
| EP | 3026300 A1 | 6/2016 |
| FR | 3091736 A1 | 7/2020 |
| GB | 1115446 A | 5/1968 |
| JP | 2002054729 A | 2/2002 |
| JP | 2004092894 A | 3/2004 |
| JP | 2005083491 A | 3/2005 |
| JP | 2010202190 A | 9/2010 |
| JP | 4573410 B2 | 11/2010 |
| JP | 2015086926 A | 5/2015 |
| JP | 2017227321 A | 12/2017 |
| JP | 2020034127 A | 3/2020 |
| JP | 2020112245 A | 7/2020 |
| JP | 2021021466 A | 2/2021 |
| JP | 2021038823 A | 3/2021 |
| KR | 20220168021 A | 12/2022 |
| WO | 2024183846 A1 | 9/2024 |

OTHER PUBLICATIONS

Non-final Office Action issued by the U.S. Patent Office for U.S. Appl. No. 18/714,614, dated Mar. 18, 2025 (16 pages).
Translation of International Search Report for Application No. PCT/EP2022/080919 dated Jan. 19, 2023 (2 pages).

* cited by examiner

TRANSMISSION COMPRISING AN OIL-GUIDING CHANNEL COMPONENT

BACKGROUND

In the prior art, transmissions for motor vehicles are in particular also used in combination with an electromotive drive. In this context, as with conventional transmissions, the transmission elements of the transmission must also be lubricated by oil. In order to increase transmission efficiency and reduce costs, an oil pump often used in conventional transmissions for transmission lubrication can be omitted. Lubrication and cooling of the transmission elements is preferably achieved by passive oil distribution. Lubrication of the rotating transmission elements is important for transmission reliability. Insufficient lubrication may cause a lack of supply of oil to the bearings of the transmission elements and the sealing rings. This may lead to increased wear and even failure of the transmission elements.

DE 10 2017 108 748 B3 discloses a transmission for a motor vehicle, which comprises a transmission housing and at least one transmission gear arranged in the transmission housing, whereby the transmission gear is arranged at least partially in an oil sump of the transmission. One section of the rotating transmission gear rolls through the oil sump and receives oil in the process. In a technical context, this process is known as splashing. In order to distribute the oil picked up by the transmission gear more effectively in the transmission, an oil-guiding channel component is provided, which is inserted into the transmission as an insert. The oil-guiding channel component has a spectacle-like structure and comprises a plurality of orifices and a guide channel having an inlet port and an outlet port, whereby the guide channel has an oil guidance direction from the inlet port to the outlet port and a channel wall that is circumferentially enclosed perpendicularly to the oil guidance direction. In DE 10 2017 108 748 B3, the channel wall is formed by a half-arc hollow body curved about a gear axis of a transmission gear of the transmission, which is in a specified mounting state of the oil-guiding channel component predominantly above an oil sump level of the transmission. The curved guide channel comprises an inlet port formed as a catch jaw for receiving oil which is raised by another transmission gear meshing with the transmission gear surrounded by the half-arch hollow body and transported further from the second transmission gear to the catch jaw. In DE 10 2017 108 748 B3, an end section of the half-arch hollow body, which faces away from the catch jaw and is closed except for a throttle bore, forms an oil collection region for collecting oil conducted through the guide channel. The throttle bore forms the only outlet port of the guide channel and therefore simultaneously represents a drain for the oil from the at least one oil collection region. The throttle bore is located vertically above the meshing region of the two transmission gears such that the oil flows off into the meshing region and wets the contact surfaces of the teeth.

SUMMARY

The invention relates to a transmission, in particular a motor vehicle transmission, comprising a transmission housing and at least one transmission gear arranged in the transmission housing, whereby the transmission gear is arranged at least partially in an oil sump of the transmission, the transmission comprising an oil-guiding channel component, and the oil-guiding channel component comprising a guide channel with an inlet port and an outlet port, whereby the guide channel has an oil guidance direction from the inlet port to the outlet port and a channel wall, which is closed circumferentially perpendicular to the oil guidance direction, the oil-guiding channel component further comprising at least one oil collection region for collecting oil that is guided through the guide channel, and the oil-guiding channel component comprising at least one drain for oil from the at least one oil collection region, whereby the oil-guiding channel component is arranged in the transmission housing such that, during operation, oil raised from the oil sump by the transmission gear passes into the inlet port and along the oil guidance direction of the guide channel to the outlet port. According to the invention, it is provided that the at least one oil collection region comprises a first reservoir, the first reservoir comprising a first reservoir wall and a first reservoir base, and the oil-guiding channel component being arranged in a predetermined mounting state, which defines an orientation of the oil-guiding channel component in the transmission housing relative to gravity, by the transmission housing being arranged such that the inlet port is positioned at the end face of the transmission gear, which is arranged at least partially in the oil sump, the first reservoir base being positioned above the transmission gear, and the oil guidance direction from the inlet port to the outlet port extending counter to the force of gravity.

In the context of the present application, "oil" is understood to mean a transmission-driven liquid lubricant, regardless of whether it is commercially marketed as oil. In particular, it can be a lubricant or similar substance referred to as an ATF (Automatic Transmission Fluid).

A specified mounting state defining an orientation of the oil-guiding channel component in the transmission housing relative to the force of gravity is understood to mean a mounting state representing a particular orientation of the oil-guiding channel component relative to the transmission housing with a known orientation of the associated transmission relative to the earth's gravitational field. The orientation of the transmission relative to the earth's gravitational field is generally known for a normal position of the transmission, whereby the normal position is the position in which the transmission is oriented relative to the force of gravity in the intended application. If the transmission is a motor vehicle transmission, the transmission assumes a certain orientation to the earth's gravitational force when the motor vehicle is horizontally aligned relative to the earth's gravitational field in the normal position. This applies regardless of whether the motor vehicle is actually moving horizontally to the earth's gravitational field or whether it is traveling on a slope at an angle of inclination. Based on a previously known mounting position of the transmission in the motor vehicle, it is therefore generally possible to derive how an oil-guiding channel component is to be installed in the transmission so that the oil-guiding channel component assumes a certain orientation relative to the force of gravity in the normal position. As the inclination angle only deviates very moderately by $+/-20°$ from the horizontal when driving downhill or uphill in most possible driving conditions of the vehicle, the mounting state is adjusted to a horizontal vehicle position in the geometrical design of the oil-guiding channel component.

An oil-guiding channel component is understood to mean a component comprising at least one guide channel for oil transport. The oil-guiding channel component can also be designed to distribute oil supplied to the oil-guiding channel component under the influence of the force of gravity in the oil-guiding channel component. The oil-guiding channel component can in particular be designed as an insert part, which is inserted into the transmission during assembly. However, it is also possible to form the oil-guiding channel component using inwardly projecting structures of the housing part of the transmission housing. Preferably, however, the oil-guiding channel component is a separately manufactured insert. The oil-guiding channel component can be made of plastic, a metal, or a plastic-metal composite. The oil-guiding channel component can have a one piece or multiple piece design. In particular, it is possible to assemble the oil-guiding channel component from two or more shell parts, which are mechanically connected to each other via catch connections or clip connections.

In the context of the present application, relative to an assumed reference point, the terms "below" or "underneath" denote a position at a point lower in the direction of the force of gravity and the terms "above" or "over" denote a position at a point higher in the direction of the force of gravity, whereby an orientation of the oil-guiding channel component corresponding to the specified mounting state is assumed.

An oil sump of the transmission is understood to mean a region within the transmission housing in which oil accumulates under the influence of the force of gravity. A transmission gear that is arranged at least partially in an oil sump of the transmission is understood to mean a transmission gear that is submerged in the oil sump with a lower part in the direction of the force of gravity, while an upper part of the transmission gear protrudes out of the oil sump. Upon rotation of the transmission gear, it receives oil from the oil sump and transports it to a release point or break-off point in the opposite direction of the force of gravity. This process is referred to as "splashing." The circulation and conducting rate of the oil through the transmission gear depend directly on the rotational speed and, via the viscosity, also on the temperature. The quantity of oil removed from the oil sump by the at least one transmission gear causes the level of the oil sump to drop during operation. The transmission gear can, therefore, be considered an oil-conducting transmission gear. Oil splashed from at least one transmission gear and possibly further transmission gears during rapid rotation in the transmission housing can reach locations from which there is no rapid return to the oil sump. These oil quantities are referred to as splash losses. To ensure that sufficient oil is still being conducted from at least one transmission gear and the transmission does not run dry, the oil sump must have an appropriate quantity of oil. On the other hand, too much oil in the oil sump is not desirable as this increases disadvantageous drag losses of the transmission. As a compromise, it is therefore desirable to supply the quantity of oil removed by the transmission gear as specifically as possible to the lubrication points in the transmission in order to avoid splash losses and to be able to lower the level in the oil sump to a level at which drag losses of the transmission are minimized.

A torsionally rigid coupling or connection between two components means that a first component cannot rotate relative to a second component. This does not preclude the first component from being axially displaceable relative to the second component.

The at least one transmission gear can be any desired gear in a set of gears. In particular, the transmission gear can mesh with another transmission gear and serve to transmit torque from a drive shaft to an output shaft within the transmission. This does not rule out the option of providing multiple oil-conducting transmission gears in the transmission.

The transmission according to the invention comprising the oil-guiding channel component enables a more targeted oil supply to bearings of rotating transmission elements within the transmission housing. This is achieved by forming a first reservoir on the oil-guiding channel component, which comprises a first reservoir wall and a first reservoir base in combination with a specially designed guide channel. In a specified mounting state, which defines an orientation of the oil-guiding channel component in the transmission housing relative to gravity, the oil-guiding channel component is arranged in the transmission housing such that the inlet port is positioned on the end face of the transmission gear, the first reservoir base is positioned above the transmission gear, and the oil guidance direction from the inlet port to the outlet port extends counter to gravity.

In contrast to the solutions known from the prior art, in which the oil collection region forms the end region of a half-arch hollow body curved about a gear axis, in the present invention the oil collection region comprises a first reservoir which is arranged above the oil conducting transmission gear. The supply of oil contained in the first reservoir allows the oil sump at the bottom of the transmission housing to sink during operation. The guide channel is designed as a simple, circumferentially closed channel, which can extend from the inlet port to an outlet port, preferably in a straight line. The port cross-section of the inlet port can correspond to the port cross-section of the outlet port. The transmission oil supplied to the guide channel's inlet port by the blade movement of the rotating transmission gear travels upwards in the guide channel without encountering any obstacles, against the force of gravity, until it emerges from the outlet port and collects in the first reservoir. The guide channel comprising the circumferential channel wall represents a guide channel integrated into the oil-guiding channel component. Oil is advantageously conducted into the guide channel, even at low rotational speeds.

In contrast to the prior art, the oil is not collected in the guide channel, but outside the guide channel in the first reservoir, so that sufficient lubrication of the transmission bearings is possible, even given rotational speed fluctuations, because the supply contained in the first reservoir can be used. At least one drain, but preferably multiple drains, can be provided on the first reservoir in order to achieve oil supply to different, lower-lying bearings in the transmission. Advantageously, compared to the prior art, the quantity of oil conducted through the guide channel during operation can be designed to be more independent of the quantity of oil drained from the oil collection region via a drain. The guide channel serves only to fill the first reservoir, while draining from the first reservoir can be adjusted via the geometrical design of the reservoir and the geometrical design of at least one drain. The oil supply to bearing points of the transmission elements can therefore be advantageously optimized both locally and over time. In particular in transmissions in which rotating transmission elements are arranged above one another in multiple planes in relation to the force of gravity, this enables improved lubrication of the bearing points.

Given that the first reservoir is advantageously used as an intermediate reservoir, faster lubrication is available when the electric machine driving the transmission is reactivated, even if it is deactivated for short periods. During longer downtimes, however, the first reservoir can also drain completely in the direction of the oil sump via a small drain port in the first reservoir base.

Advantageously, an end of the channel wall of the guide channel facing away from the inlet port can form a circumferential wall projecting above the first reservoir base of the first reservoir and delimiting the outlet port such that oil exiting the outlet port of the guide channel collects in the first reservoir, draining in the direction of the force of gravity. Oil draining over the circumferential wall can thus advantageously drain directly into the first reservoir and fill it.

Advantageously, the guide channel can be straight and extend tangentially to an end face of the transmission gear, at least in the region of the transmission gear, whereby the inlet port is positioned in the immediate vicinity of the end face of the transmission gear. In close proximity to the end face of the transmission gear in this context means that the inlet port is mounted close enough to the transmission gear that the transmission oil can be fed directly to the inlet port from the end face.

The inlet port can be designed as a catching mouth, whereby the circumferential edge of the inlet port is beveled according to the tangential angle of the guide channel, so that the inlet port comes as close as possible to the end face of the transmission gear. The contour of the circumferential edge can be adapted to the radius of curvature of the end face of the transmission gear. The oil conducted by the transmission gear, which is partially thrown away under the influence of centrifugal force, enters the guide channel at the location of the inlet port. The movement impulse of the oil separating from the transmission gear largely corresponds to the oil guidance direction in the guide channel, so that the oil preferably reaches the outlet port of the guide channel without any obstacles. The oil escaping from the outlet port of the guide channel runs off in the direction of gravity and collects in the first reservoir, which is filled as a result. The oil draining from the reservoir reaches the intended lubrication points of the transmission "passively" to a certain extent (i.e., under the influence of gravity).

The oil-guiding channel component can be used particularly advantageously in combination with a transmission which comprises a drive shaft and an output shaft, whereby the output shaft can be driven by means of the transmission gear, whereby a coupling element is coupled to the transmission gear such that the transmission gear can be driven by means of the coupling element, whereby a coupling device comprising a coupling element is provided in the transmission, whereby the coupling element is coupled non-rotatably to the drive shaft, whereby the coupling device can be used to couple the coupling element to the coupling element in a rotationally fixed manner and to uncouple it from the coupling element, and whereby the oil-guiding channel component comprises a first drain which projects from the first reservoir wall above the first reservoir base and comprises a drain port, through which draining oil is guided to a bearing of a pinion which is rotatably mounted on the drive shaft and is connected to the coupling element in a rotationally fixed manner. In a transmission of this type, the drive shaft, which is driven directly or indirectly by an electric machine, for example, can be decoupled from the output shaft of the transmission. The output shaft can, e.g., be coupled to the wheels of a motor vehicle. When the electric machine is deactivated, the output shaft can be decoupled from the drive shaft by means of the coupling device. When the motor vehicle is in motion, the wheels of the motor vehicle continue to drive the at least one transmission gear and the pinion meshing with it, but not the drive shaft. By means of the oil-guiding channel component, the bearing of the rotating pinion located on the drive shaft can then also be advantageously supplied with oil in a decoupling stage of the coupling device without the drive shaft having to be rotated for this purpose.

In one exemplary embodiment, the drive shaft is designed as a hollow shaft comprising an axial bore. When the pinion meshes with the transmission gear, oil draining from the drain port of the first drain can be fed to the axial bore of the drive shaft and from there reach, e.g., the bearing of the pinion via at least one radial bore. The bearing of the pinion can, e.g., be designed as a nail bearing, the oil lubrication of which is reliable.

In this context, it is advantageous if the oil draining from the drain port of the first drain under the influence of gravity enters a chamber formed on a first housing component of the transmission housing, in which a baffle plate is arranged, whereby a channel section is formed centrally on the baffle plate, whereby the channel section engages in the axial bore of the drive shaft, whereby oil contained in the chamber drains into the channel section via the baffle plate and thus enters the axial bore of the drive shaft. The oil supplied to the chamber wets the baffle plate and runs along the baffle plate into the channel section. Given that the latter engages in the axial bore of the drive shaft, the baffle plate has the advantage of ensuring a permanent supply of oil to the axial bore even when the drive shaft is stationary or rotating slowly, so that the nail bearing of the pinion rotating on the drive shaft can be lubricated without any problems.

In one exemplary embodiment, a rotor shaft of an electric machine mounted in at least one bearing in the transmission housing can be provided, whereby the drive shaft can be driven by means of the rotor shaft. For example, in this case it is advantageous for the oil collection region of the oil-guiding channel component to comprise a second reservoir, in which case the second reservoir comprises a second reservoir wall and a second reservoir base, the second reservoir being connected to the first reservoir via a connection channel, and a second drain projecting from the second reservoir wall of the second reservoir in the specified mounting direction above the second reservoir base and comprises a drain port, through which oil is guided in the direction of the bearing of the rotor shaft. Due to the geometric design and position of the second reservoir and the second drain, the oil supply for the rotor shaft bearing is able to be designed independently of the oil supply to the pinion bearing.

Of course, further reservoirs can also be provided on the oil-guiding channel component, and/or further drains can be provided at the first or second reservoir, using which further bearings of rotating transmission elements are lubricated by oil.

Advantageously, the edge of the circumferential wall on a side facing the first reservoir can have a distance from the first reservoir base which is less than the distance of the edge of the circumferential wall from the second reservoir base on a side facing the second reservoir. When the transmission gear rotates and oil is conducted through the guide channel, oil first enters the first reservoir and at least partially fills it before the oil enters the second reservoir via the connection channel. As a result, the oil is prevented from draining in the direction of the second drain too early, and it is ensured that the first drain is always supplied with oil. In some respects, therefore, in this exemplary embodiment, the draining of the oil via the first drain and the second drain is cascade-like, whereby the first reservoir is initially filled until oil drains from the oil-guiding channel component via the first drain and simultaneously shortly before or even a short time later, the supplied oil begins to fill the second reservoir via the connection channel such that oil in this example only drains via the second drain after it has already drained via the first drain.

The transmission housing can advantageously further comprise a first housing component comprising a first housing wall region and a second housing component comprising a second housing wall region, which is placed on the first housing component, whereby a third housing wall region is created in the support region of the first housing component and the second housing component, whereby the first housing wall region, the second housing wall region, and the third housing wall region enclose an end of the transmission gear in the oil sump facing away from the oil-guiding channel component on three sides. Without further orifice elements or additional measures, this advantageously creates a region that is always filled with oil from the oil sump, in which the at least one transmission gear rotates. The distances between the housing wall regions and the transmission gear are dimensioned to have a gap dimension that enables reliable wetting and oil conduction through the transmission gear. The first housing wall region, the second housing wall region, the third housing wall region, the transmission gear and the guide channel form a pump system, through which oil is transported from the oil sump through the guide channel against the force of gravity to the outlet port of the guide channel when the transmission gear rotates.

The transmission gear can be coupled in a rotationally fixed manner to a differential of the transmission, whereby a first output shaft and a second output shaft are coupled to the differential, whereby the first output shaft and the second output shaft are driven in rotation by the differential. The transmission gear can, e.g., be attached to a differential cage of the differential as a spur gear. Since the differential can be installed together with the other transmission elements in the transmission housing, the housing components surrounding the differential can advantageously be used very easily to flank the end of the transmission gear facing away from the oil-guiding channel component in order to achieve the effect of a pump system described above.

BRIEF DESCRIPTION OF THE DRAWINGS

Possible exemplary embodiments of the invention are explained hereinafter with reference to the accompanying drawings. Shown in the drawings are.

8

Figure 8:
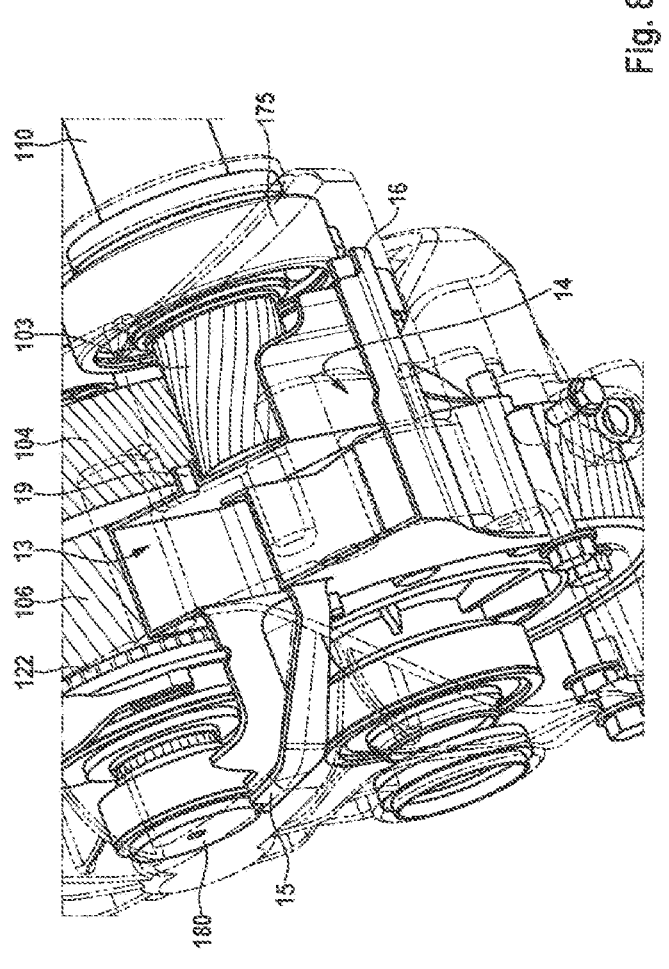
FIG. 8 is a perspective top view of a transmission comprising the oil-guiding channel component.
Figure 9:
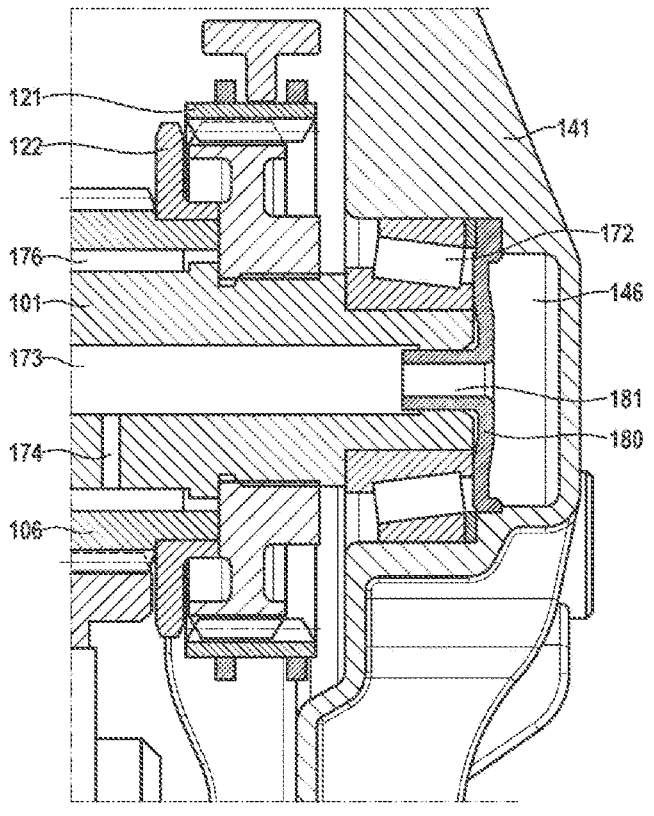

FIG. 9 a detail of the transmission housing in FIG. 8 comprising a baffle plate, as can be used in conjunction with the oil-guiding channel component.

DETAILED DESCRIPTION

Figure 1:
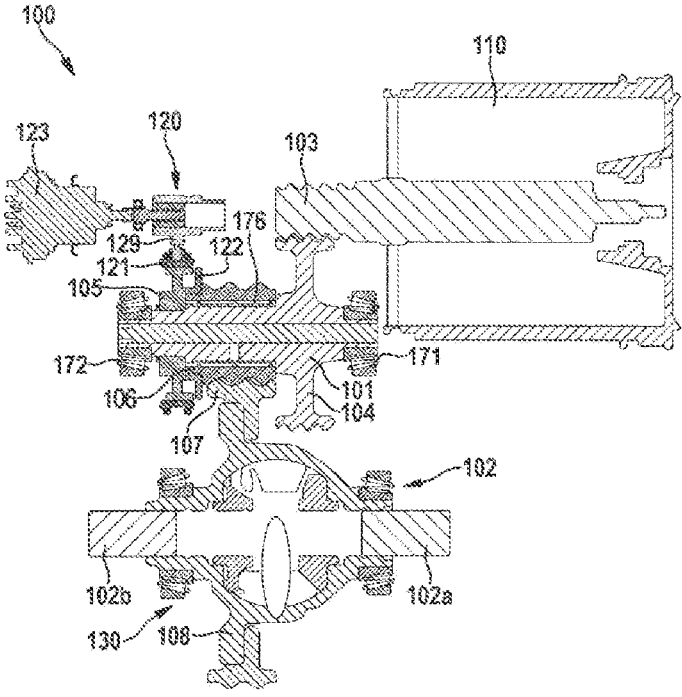
FIG. 1 a cross-sectional view of a transmission of a motor vehicle driven by an electric machine, FIG. 2 a perspective view of an exemplary embodiment of an oil-guiding channel component for use in a transmission, as shown in FIG. 1, FIG. 3 a top view of the oil-guiding channel component in FIG. 2, FIG. 4 a further perspective view of the oil-guiding channel component in FIG. 2 and FIG. 3, FIG. 5 an enlarged detailed view from FIG. 6 for a transmission according to the invention comprising the oil-guiding channel component from FIGS. 1 to 4, FIG. 6 a cross-section through a transmission according to the invention comprising the oil-guiding channel component from FIGS. 1 to 4, FIG. 7 a side view of the transmission from FIG. 6 comprising the oil-guiding channel component.

FIG. 1 shows a propulsion device for a motor vehicle comprising a transmission 100. The transmission 100 is connected on the input side to an electric machine 110 having a rotor shaft 103. The rotor shaft 103 meshes with a gear 104 that is rotationally coupled to a drive shaft 101 of the transmission. The drive shaft 101 is rotatably mounted about its outer circumference at two axially spaced bearing points 171 and 172 in a transmission housing (not shown in FIG. 1).

Furthermore, the transmission 100 comprises a coupling device 120, which can be controlled, for example by means of an electrically actuated rotary actuator 123. The electrical actuator 123 can, e.g., act via a spindle drive and a shift fork 129 on a coupling element 121 which is axially displaceably mounted on a guide hub 105. The coupling element 121 is, e.g., annular and can rotate relative to the shift fork 129. The coupling element 121 can comprise an inner cog that engages in an outer cog of the guide hub 105 such that the coupling element 121 can be displaced on the guide hub 105 parallel to the axis of the drive shaft 101. The guide hub 105 and the coupling element 121 engaged therewith are mounted on the drive shaft 101 in a rotationally fixed manner. Furthermore, a coupling element 122 is provided that is coupled to a pinion 106 in a rotationally fixed manner. The pinion 106 is, e.g., rotatably mounted on the drive shaft 101 by way of a bearing 176 designed as a nail bearing. The coupling element 122 can comprise outer cogs. When the rotary actuator 123 is actuated, the spindle drive displaces the coupling element 121 in the axial direction via the shift fork until the inner cog of the coupling element 121 engages the outer cog of the coupling element 122, whereby the coupling element 121 is coupled to the coupling element 122 in a rotationally fixed manner. The coupling causes the gear 104, the drive shaft 101, the guide hub 105, the coupling element 121, the coupler element 122, and the pinion 106 to rotate as a block about the axis of the drive shaft 101. When decoupling is performed, the rotary actuator 123 is used to pull the coupling element 121 away from the coupler element 122 in FIG. 1 to the left, thereby disengaging the coupling between the pinion 106 and the drive shaft 101. The pinion 106 can then rotate about the drive shaft 101.

Figure 7:
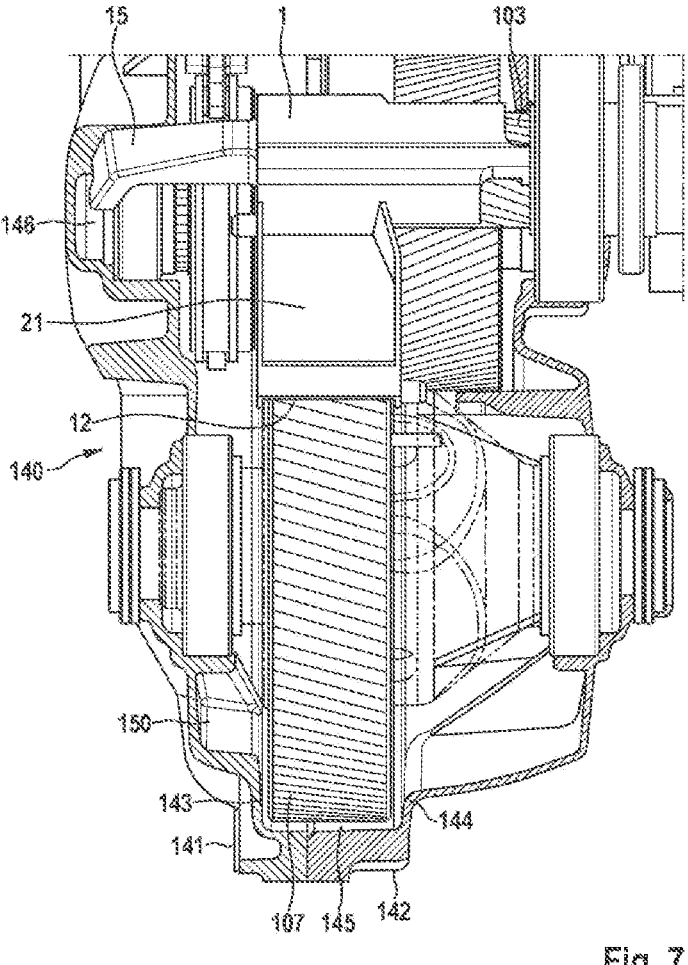

The pinion 106 meshes with a transmission gear 107. In the illustrated exemplary embodiment, the transmission gear 107 is coupled to a differential 130 in a rotationally fixed manner. The differential 130 comprises an output shaft 102 in the form of a first output shaft 102*a* and a second output shaft 102*b* that can be rotationally driven by the differential 130. The transmission gear 107 is fixedly connected to the differential cage 108 of the differential 130. As shown in FIG. 7, the differential 130 can be integrated into the transmission housing 140 of the transmission 100.

As already described, the coupling between the pinion 106 and the drive shaft 101 is disengaged in the decoupled state by means of the coupling device 120. If, for example, the electric machine is then additionally switched off in a driving state of a motor vehicle, the rotor shaft 103 and the drive shaft 101 are no longer driven. The wheels of the still rolling motor vehicle then drive the transmission gear 107 via the output shaft 102, which meshes with the pinion 106 so that the pinion 106 rotates about the drive shaft 101. Even in this state, it must be ensured that, for example, the bearing

176 of the pinion 106 arranged above the oil sump of the transmission 100 is sufficiently supplied with oil.

Figure 2:
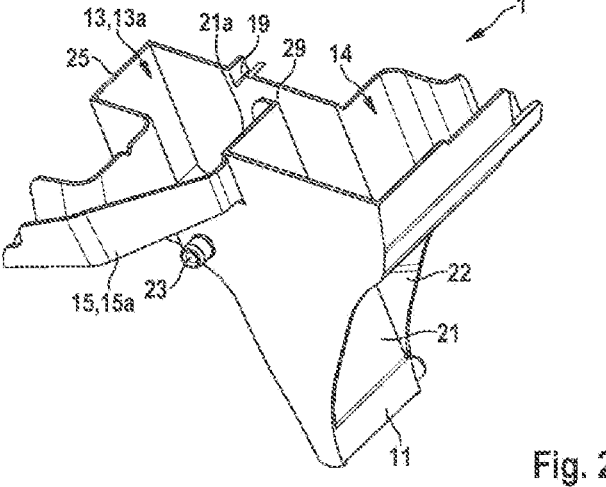
Figure 3:
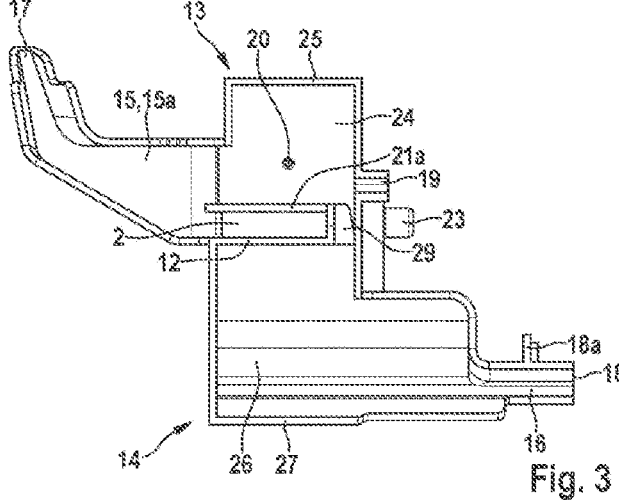
Figure 4:
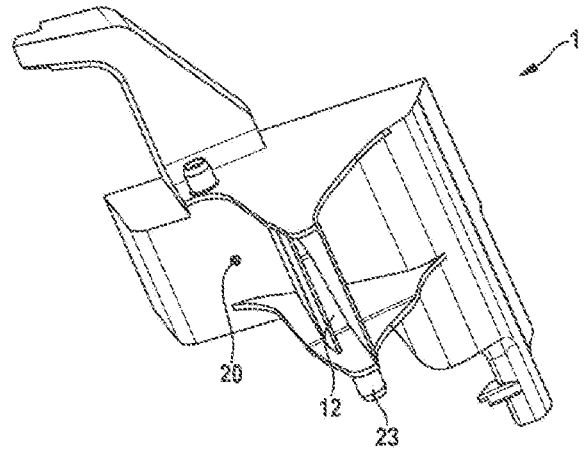

FIG. 2, FIG. 3, and FIG. 4 show an exemplary embodiment of an oil-guiding channel component 1 that can, e.g., be installed in the transmission 100 shown in FIG. 1. As shown in this context, the oil-guiding channel component 1 can in particular be designed as an insert component which is inserted into the transmission 100 during assembly of the transmission 100. The oil-guiding channel component 1 can be made of plastic, a metal, or a plastic-metal composite and can have a one piece or multiple piece design. In particular, it is possible to assemble the oil-guiding channel component from two or more shell components, which are mechanically connected to each other via catch connections or clip connections.

The oil-guiding channel component 1 comprises a guide channel 2 having an inlet port 11 and an outlet port 12, whereby the guide channel 2 has an oil guidance direction F (shown in FIG. 5) from the inlet port 11 to the outlet port 12 and a channel wall 21 that is closed all around perpendicularly to the oil guidance direction F. The oil-guiding channel component 1 further comprises an oil collection region 13*a* for the collection of oil conducted by the guide channel 2 and a drain 15*a* for oil from the oil collection region 13*a*.

The oil collection region 13*a* comprises a first reservoir 13. The first reservoir 13 comprises a first reservoir wall 25 and a first reservoir base 24. An end of the channel wall 21 facing away from the inlet port 11 of the guide channel 2 forms a circumferential wall 21*a* projecting above the first reservoir base 24 of the first reservoir 13 and delimiting the outlet port 12, as can be easily seen in FIG. 2, FIG. 3 and in particular in FIG. 5. The oil-guiding channel component 1 further comprises a first drain 15 projecting above the first reservoir base 24 from the first reservoir wall 25 and having a drain port 17. The first drain 15 is designed as an angled trough. In addition, a further drain 19 can be formed on the upper edge of the first reservoir wall 25, which functions as an overflow. The first reservoir 13 can comprise a small drain port 20 in the first reservoir base 24 formed as a bore, via which the first reservoir 13 can be emptied during extended downtimes. The diameter of the drain port 20 is designed to be small enough that the quantity of oil drained via the drain port 20 is significantly smaller than the quantity of oil supplied to the guide channel 2 during operation.

As further shown in FIG. 2, FIG. 3, and FIG. 4, the oil collection region 13*a* of the oil-guiding channel component 1 comprises a second reservoir 14, whereby the second reservoir 14 comprises a second reservoir wall 27 and a second reservoir base 26. As can be seen in FIG. 3, the second reservoir 14 is connected to the first reservoir 13 via a connection channel 29 (FIG. 3). A second drain 16 projects above the second reservoir base 26 from the second reservoir wall 27 of the second reservoir 14 and comprises a drain port 18. The second drain 16 can also be designed as a trough. Additionally, the second drain 16 can, e.g., comprise a further drain port 18*a* that is angled from the drain 16.

The edge of the circumferential wall 21*a* preferably is, on a side facing the first reservoir 13, at a distance from the first reservoir base 24 which is less than the distance of the edge of the circumferential wall 21*a* from the second reservoir base 26 on a side facing the second reservoir 14.

The oil-guiding channel component 1 shown in FIGS. 2 to 4 is designed to be arranged in the transmission housing 140 of the transmission 100 in a specified mounting state, which defines an orientation of the oil-guiding channel component relative to the force of gravity G. Without being limited thereto, the oil-guiding channel component 1 is preferably intended to be inserted into the transmission 100 shown in FIG. 1. To this end, the oil-guiding channel component 1 comprises holder cams 23 projecting from the sides of the oil-guiding channel component 1, which allow the oil-guiding channel component 1 to be installed and anchored in a transmission housing 140 of a transmission 100 in a specified orientation relative to the normal position of the transmission 100. As can be further seen in FIG. 2, the oil-guiding channel component 1 can be provided with reinforcing ribs 22 for increasing stability.

Figure 5:
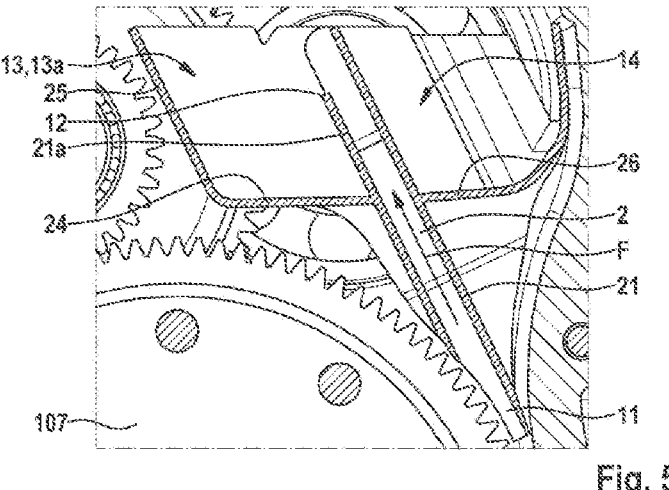
Figure 6:
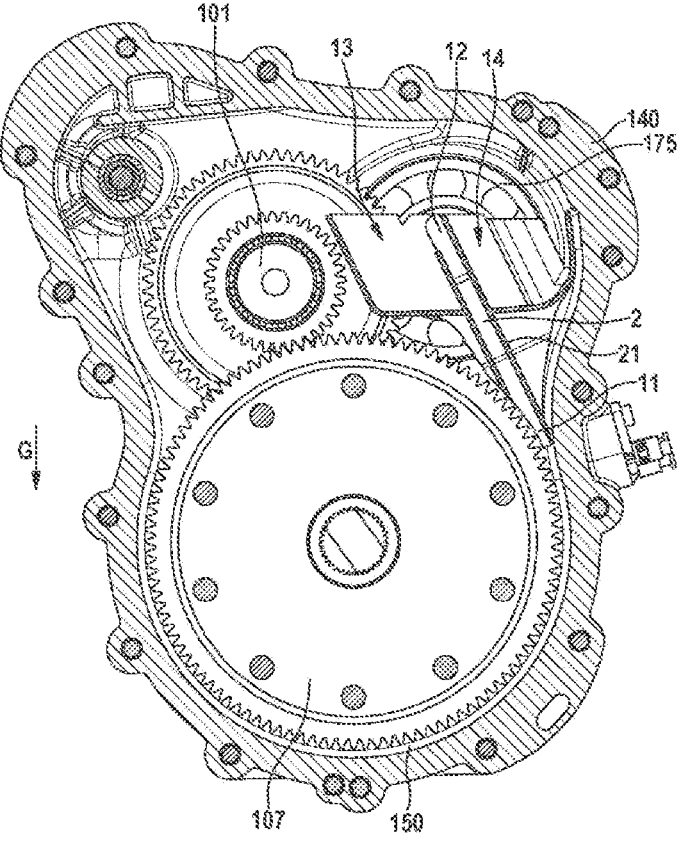

FIG. 6 and the enlarged detail view in FIG. 5 show a transmission 100, the basic structure of which corresponds to the transmission shown in FIG. 1, with the oil-guiding channel component 1 in FIGS. 2 to 4 installed therein. It can be seen that the inlet port 11 of the guide channel 2 is positioned on the end face of the transmission gear 107 and in the immediate vicinity of the end face of the transmission gear 107, while the first reservoir base 24 of the first reservoir 13 is positioned above the transmission gear 107. The oil guidance direction F therefore extends from the inlet port 11 to the outlet port 12 in the opposite direction of gravitational force G, the orientation of which is shown for the normal position of the transmission 100 in FIG. 6.

As shown in FIGS. 5 and 6, the guide channel 2 is preferably straight-lined and preferably extends tangentially to an end face of the transmission gear 107 at least in the region of the transmission gear 107. The inlet port 11 can be designed as a catch jaw, whereby the circumferential edge of the inlet port 11 can be beveled according to the angle formed by the direction of the force of gravity and conducting direction F, so that the inlet port 11 can be brought as close as possible to the end face of the transmission gear 107. The contour of the circumferential edge can be adapted to the radius of curvature of the end face of a transmission gear 107 as shown.

The transmission gear 107 is partially arranged in an oil sump 150, as will be explained later with reference to FIG. 7. The transmission gear 107 receives oil from the oil sump 150 and transports it into the inlet port 11 of the guide channel 2. The movement pulse of the oil pushes it in the guide channel 2 in the oil guidance direction F up to the outlet port 12.

As best seen in FIG. 5, the oil exiting the outlet port 12 of the guide channel 2 flows via the circumferential wall 21*a* in the direction of the force of gravity G and thus in the direction of the first reservoir 13, where it accumulates. Since the edge of the circumferential wall 21*a*, on the side facing the first reservoir 13, is at a distance from the first reservoir base 24 which is smaller than the distance of the edge of the circumferential wall 21*a* from the second reservoir base 26 on a side facing the second reservoir 14, the oil first flows over the edge of the circumferential wall 21*a* on the side facing the first reservoir 12, so that the latter is first filled. Once the oil reaches the connection channel 29, the second reservoir 14 also fills with oil via said channel. The oil level rising in the first reservoir 13 and the second reservoir 14 reaches the first drain 15 and the second drain 16 after a short time and flows out of the oil-guiding channel component 1 under the influence of the force of gravity G via the first drain port 17 and the second drain port 18 and third drain port 18*a*.

FIG. 7 shows a side view of the transmission 100 and the oil-guiding channel component 1 installed in it. The direction of gravity G is directed vertically, from top to bottom, in the plane of the drawing in FIG. 7. It can be seen that the transmission housing 140 comprises a first housing component 141 and a second housing component 142. However, other housing components can also be provided. The first housing component 141 and the second housing component 142 can, for example, form housing half-shells, which can be placed on top of each other and joined together. In the lower region of the transmission housing 140, the first housing component 141 is provided with a first housing wall region 143 and the second housing component 142 is provided with a second housing wall region 144. The first housing wall region 143 and the second housing wall region 144 can be easily produced by molding castings accordingly.

A third housing wall region 145 is created in the support region of the first housing component 141 and the second housing component 142. The third housing wall region 145 is formed by the inner side of the collar surfaces of a collar, which is formed in the lower region of the transmission housing 140 in each case on the first housing component 141 and the second housing component 142. The first housing wall region 143, the second housing wall region 144, and the third housing wall region 145 enclose the end of the transmission gear 107 facing away from the oil-guiding channel component 1 in the oil sump 150 on three sides. A narrow gap remains between the outer surfaces of the transmission gear 107 and the housing wall regions, which is always filled with transmission oil from the oil sump 150, the level of which is located directly above the housing wall regions. A pump system is formed by the first housing wall region 143, the second housing wall region 144, the third housing wall region 145, the transmission gear 107 and the guide channel 2, through which oil is transported from the oil sump 150 into the guide channel 2 when the transmission gear 107 rotates.

FIG. 8 illustrates how the oil draining from the oil-guiding channel component 1 via the first drain 15 and the second drain 18 can be fed to the bearings in the transmission 100. Seen in FIG. 8 is a baffle plate 180 mounted on the drive shaft 101. An enlarged, mirror-inverted representation of the baffle plate 180 is shown in FIG. 9. As can be seen in FIG. 8 and FIG. 9, the oil draining from the drain port 17 of the first drain 15 can enter a chamber 146 formed on the first housing component 141 of the transmission housing 140, in which the baffle plate 180 is arranged. The baffle plate 180 is designed as an annular base body made of, e.g., metal, the outer edge of which is mounted between the first housing component 141 and a bearing 172 of the drive shaft 101. As can be seen in FIG. 9, a cylindrical channel section 181 is formed in the center of the baffle 180, which engages in an axial bore 173 of the drive shaft 101 designed as a hollow shaft. The oil supplied to the chamber 146 via the drain port 17 drains into the channel section 181 via the baffle plate 180 and thus enters the axial bore 173 of the drive shaft 101. From there, the oil reaches the bearing 176 of the pinion 106 directly via at least one radial bore 174 in the drive shaft.

As can also be seen in FIG. 8, the drain 16 can be designed to discharge oil in the direction of a bearing 175 of the rotor shaft 103. The bearing 175 can, e.g., be designed as a ball bearing. The drain port 18 of the second drain 16 in the region of the layer 175 is also clearly visible in FIG. 6.

Consequently, completely different bearings within the transmission 100 are supplied with lubricating oil by means of the oil-guiding channel component 1. In the illustrated exemplary embodiment of a transmission comprising a coupling device (referred to as a disconnect transmission), this is advantageously performed independently of the coupling state of the coupling device, so there is always sufficient lubrication of the bearings in various coupling states.

However, the transmission comprising the oil-guiding channel component 1 can also be designed differently. It is understood that, by means of the at least one first reservoir and the drains and/or connection channels branching out from it to further reservoirs, an optimum supply of lubricating oil to the bearings of rotating transmission elements can also be optimally adjusted for differently constructed transmissions.

What is claimed is:

1. A transmission (100) comprising:
a transmission housing (140) and at least one transmission gear (107) arranged in the transmission housing (140), wherein the at least one transmission gear (107) is arranged at least partially in an oil sump (150) of the transmission (100), wherein the transmission (100) comprises an oil-guiding channel component (1), wherein the oil-guiding channel component (1) comprises a guide channel (2) spaced from the transmission housing (140) and comprising an inlet port (11) and comprising an outlet port (12), wherein the guide channel (2) has an oil guidance direction (F) from the inlet port (11) to the outlet port (12) and a channel wall (21) which is closed perpendicular to the oil guidance direction (F), wherein the oil-guiding channel component (1) further comprises at least one oil collection region (13*a*) for collecting oil guided through the guide channel (2), wherein the oil-guiding channel component (1) comprises at least one drain (15*a*) for oil from the at least one oil collection region (13*a*), wherein the oil-guiding channel component (1) is arranged in the transmission housing (100) such that, during operation, oil raised from the oil sump (150) by the at least one transmission gear (107) passes into the inlet port (11) and along the oil guidance direction (F) of the guide channel (2) to the outlet port (12), wherein the at least one oil collection region (13*a*) comprises a first reservoir (13), wherein the first reservoir (13) comprises a first reservoir wall (25) and a first reservoir base (24) defining a bottom wall of the first reservoir (13), wherein the oil-guiding channel component (1) is arranged in the transmission housing (140) in a specified mounting state, which defines an orientation of the oil-guiding channel component (1) in the transmission housing (140) relative to a force of gravity (G) such that the inlet port (11) is positioned at an end face of the at least one transmission gear (107), which is arranged at least partially in the oil sump (150), the first reservoir base (24) is positioned entirely above the at least one transmission gear (107), and the oil guidance direction (F) from the inlet port (11) to the outlet port (12) extends counter to the force of gravity (G), wherein an end of the channel wall (21) of the guide channel (2) facing away from the inlet port (11) forms a first wall (21*a*) extending through and projecting into the at least one oil collection region (13*a*) and delimiting the outlet port (12) such that oil emerging from the outlet port (12) of the guide channel (2) collects in the first reservoir (13), draining in the direction of gravity (G), wherein the first wall (21*a*) is above the first reservoir base (24) and another portion of the channel wall (21) is below the first reservoir base (24).

2. The transmission (100) according to claim 1, wherein the guide channel (2) is straight and extends tangentially to an end face of the at least one transmission gear (107) at least in a region of the at least one transmission gear (107), and the inlet port (11) is positioned in an immediate vicinity of the end face of the at least one transmission gear (107).

3. The transmission (100) according to claim 1, wherein the transmission comprises a drive shaft (101) and an output shaft (102), wherein the output shaft (102) can be driven by the at least one transmission gear (107), wherein a coupling element (122) is coupled to the at least one transmission gear (107) such that the at least one transmission gear (107) can be driven by the coupling element (122), wherein a coupling device (120) comprising a coupling element (121) is provided in the transmission, wherein the coupling element (121) of the coupling device (120) is coupled to the drive shaft (101) in a rotationally fixed manner, wherein, by the coupling device (120), the coupling element (121) can be coupled to and uncoupled from the coupling element (122) in a rotationally fixed manner, and wherein the oil-guiding channel component (1) comprises a first drain (15) which projects from the first reservoir wall (25) above the first reservoir base (24) and comprises a drain port (17), through which draining oil is guided to a bearing (176) of a pinion (106) rotatably mounted on the drive shaft (101) and nonrotatably coupled to the coupling element (122).

4. The transmission (100) according to claim 3, wherein the drive shaft (101) is configured as a hollow shaft comprising an axial bore (173), wherein the pinion (106) meshes with the at least one transmission gear (107), wherein oil draining from the drain port (17) of the first drain (15) passes into the axial bore (173) of the drive shaft (101) and from there via at least one radial bore (174) to the bearing (176).

5. The transmission (100) according to claim 4, wherein the oil draining from the drain port (17) of the first drain (15) passes into a chamber (146), which is formed on a first housing component (141) of the transmission housing (140) and within which a baffle plate (180) is arranged, wherein a channel section (181) is formed centrally on the baffle plate (180), wherein the channel section (181) engages in the axial bore (173) of the drive shaft (101), wherein oil contained in the chamber (146) drains via the baffle plate (180) into the channel section (181) and thus enters the axial bore (173) of the drive shaft (101).

6. The transmission according to claim 4, wherein the bearing (176) is a nail bearing.

7. The transmission (100) according to claim 1, wherein a rotor shaft (103) of an electric machine (110) mounted in at least one bearing (175) in the transmission housing is provided, wherein the transmission comprises a drive shaft (101), wherein it is possible for the drive shaft (101) to be driven by the rotor shaft (103), and wherein the at least one oil collection region (13a) of the oil-guiding channel component (1) comprises a second reservoir (14), wherein the second reservoir (14) comprises a second reservoir wall (27) and a second reservoir base (26), wherein the second reservoir (14) is connected to the first reservoir (13) via a connection channel (29), wherein a second drain (16) projects in a specified mounting direction above the second reservoir base (26) from the second reservoir wall (27) of the second reservoir (14) and comprises an drain port (18), through which oil is guided in a direction of the at least one bearing (175) of the rotor shaft (103).

8. The transmission (100) according to claim 7, wherein an edge of the first wall (21a) on a side facing the first reservoir (13) is at a distance from the first reservoir base (24), which is smaller than a distance between the edge of the first wall (21a) and the second reservoir base (26) on a side facing the second reservoir (14), and wherein, when the at least one transmission gear (107) rotates, oil first enters the first reservoir (13) before oil enters the second reservoir (14) via the connection channel (29).

9. The transmission (100) according to claim 1, wherein the transmission housing (140) comprises a first housing component (141) having a first housing wall region (143) and a second housing component (142), which is placed on the first housing component (141) and comprises a second housing wall region (144), wherein a third housing wall region (145) is provided in a support region of the first housing component (141) and the second housing component (142), wherein the first housing wall region (143), the second housing wall region (144) and the third housing wall region (145) enclose an end of the at least one transmission gear (107) facing away from the oil-guiding channel component (1) in the oil sump (150) on three sides.

10. The transmission according to claim 9, wherein a pump system is formed by the first housing wall region (143), the second housing wall region (144), the third housing wall region (145), the at least one transmission gear (107), and the guide channel (2), by which pump system oil is transported from the oil sump (150) through the guide channel (2) against the force of gravity (G) to the outlet port (12) of the guide channel (2) when the at least one transmission gear (107) rotates.

11. The transmission (100) according to claim 1, wherein the at least one transmission gear (107) is coupled in a rotationally fixed manner to a differential (130) of the transmission (100), wherein a first output shaft (102a) and a second output shaft (102b) are coupled to the differential (130), wherein the first output shaft (102a) and the second output shaft (102b) are driven in a rotational manner by the differential (103).

12. The transmission according to claim 1, wherein the transmission is a motor vehicle transmission.

13. The transmission according to claim 1, wherein the at least one oil collection region (13a) of the oil-guiding channel component (1) comprises a second reservoir (14), wherein the second reservoir (14) comprises a second reservoir wall (27) and a second reservoir base (26), wherein the second reservoir (14) is connected to the first reservoir (13) via a connection channel (29).

* * * * *